J. FALTUS.
SHUTTLE EYE.
APPLICATION FILED APR. 1, 1912.

1,086,446.

Patented Feb. 10, 1914.

WITNESSES

Joseph Faltus INVENTOR

BY

ATTORNEY

UNITED STATES PATENT OFFICE.

JOSEPH FALTUS, OF FALL RIVER, MASSACHUSETTS, ASSIGNOR OF ONE-HALF TO CARL C. FORSTER, OF FALL RIVER, MASSACHUSETTS.

SHUTTLE-EYE.

1,086,446.  Specification of Letters Patent.  Patented Feb. 10, 1914.

Application filed April 1, 1912. Serial No. 687,854.

*To all whom it may concern:*

Be it known that I, JOSEPH FALTUS, of Fall River, in the county of Bristol and Commonwealth of Massachusetts, have invented an Improvement in Shuttle-Eyes, of which the following description, in connection with the accompanying drawings, is a specification, like letters on the drawings representing like parts.

The objects of this invention are to provide a shuttle eye which can be easily threaded without applying the lips to the shuttle, which will retain the thread in proper position and apply thereto such amount of tension as may be needed, and which can be inserted and securely fastened in shuttles of the ordinary type.

Figure 1:
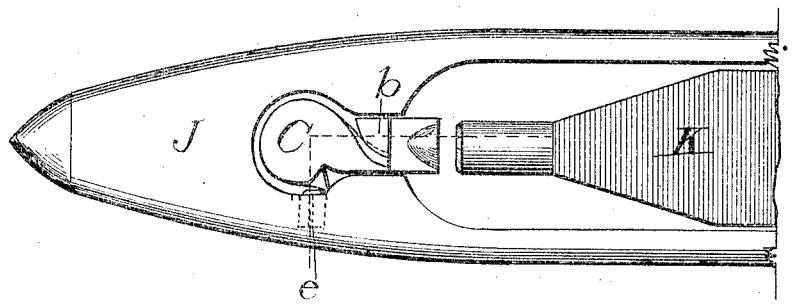
Figure 2:
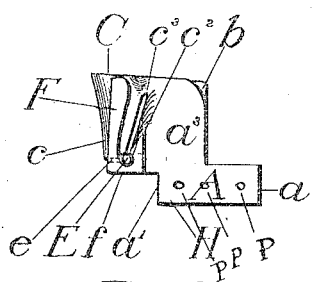
Figure 3:
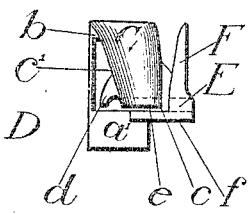
Figure 4:
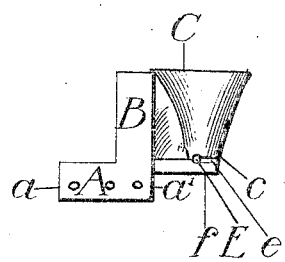
Figure 5:
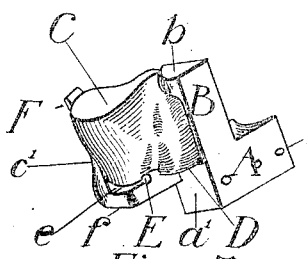
Figure 6:
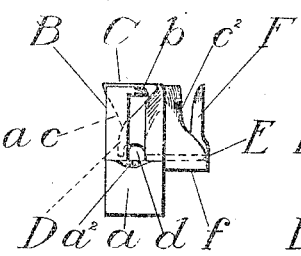
Figure 7:
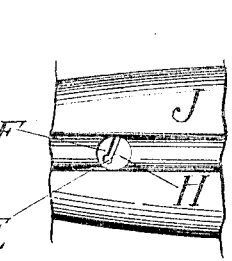

In the accompanying drawings, Figure 1 is a top view of a shuttle having my improved eye; Fig. 2 is a vertical view from the outside of the eye removed from the shuttle; Fig. 3 is a front view of the eye removed from the shuttle; Fig. 4 is an inside view of the eye removed from the shuttle; Fig. 5 is an isometric view from the front and inside of the eye removed from the shuttle; Fig. 6 is a rear view of the eye removed from the shuttle; and Fig. 7 is a side view of the shuttle and eye showing the opening through the shuttle wall.

The shuttle J is made of wood and is of usual construction. The base of the eye A is adapted to fit the body of the shuttle to which it is fastened by pins passing through the holes P. The front side of the base $a'$ also rests against the wood of the shuttle and assists to retain the eye in position. The flat base $f$ of the guide-piece C also rests upon the shuttle body and still further assists in holding the eye secure against the loosening effect of the repeated shocks from the operation of the shuttle.

Integral with the bed-piece is the guide-piece C which is shaped something like an inverted truncated cone. On the front, and on the outer side, the guide-piece C is decidedly slanting, ($c'$ Fig. 3). The side of guide-piece C toward the lock-piece F is nearer vertical. Under the front of the guide-piece C is the guide-slot $e$ leading into the thread-guide E. (See Fig. 5). Integral with the rear inner side of guide-piece C is the inner lock-piece D which in connection with the vertical lock-piece B and the curved upper surface of the rearwardly extended base $a$ serves to keep the thread in position. The vertical guide-piece B comes close to the outer side of D, there being just room between them for the passage of the yarn when the shuttle is threaded. This vertical lock-piece has the off-set top $b$ which serves still further to prevent the yarn from working out of the eye during the operation of the shuttle.

Referring to Fig. 6, when the shuttle is in operation the thread passes from the bobbin over the curved base $a^2$ through the passage $d$ into the thread-guide E (see Fig. 5), and through the thread-guide E to the outside of the shuttle. The outer lock-piece F prevents the yarn from being pulled out of place during the backward movement of the shuttle; and the projection $c^2$ performs the same function during the forward movement of the shuttle. The projection $f$ is integral with the base A. The outer end of it extends through the wall of the shuttle, where its parts F and $c^2$, in connection with the transverse hole E, form the outer portion of the shuttle-eye. (See Fig. 7). The upper rear part of $f$ joins and is integral with the rear part of the guide piece C, and is provided with a swelled projection. Down over this projection is the shallow groove $c^3$, which terminates in the outer end of the thread-guide E, forming a slight notch in said outer end. The direction of this groove $c^3$ is nearly parallel with the rear side of the lock-piece F.

The shuttle is threaded as follows: The end of the yarn is drawn forward and passes over the top of the curved base $a^2$. It is then slipped down between the off-set top $b$ of the vertical guide-piece B near the inner lock-piece D. At this point the yarn comes straight forward from the shuttle spindle over the curved base $a^2$ near the lock-piece D, in the longitudinal hole $d$, Fig. 6. The end is then lapped around the front of the conical guide-piece C and drawn backward. This causes the yarn to fly down the front side of the guide-piece C into the transverse guide-piece E. At this point the position of the yarn is such that it extends straight forward from the shuttle through the longitudinal guide-hole $d$, through the transverse guide hole E. The free end is still held in the hand and the yarn forms a partial loop around the guide-piece C, flying on the outside of said guide-piece and the groove $c^3$.

See Fig. 2 and Fig. 3. The end of the yarn has not yet been threaded through the outer eye of the shuttle. At this point the operative arrests the unwinding of the yarn from the bobbin K and draws the free end which lies in the groove $c^3$ in the guide piece sharply to the right. The result of this causes the yarn to break at a point somewhat above its contact with the guidepiece C. The free end of the yarn recoils downward and guided by the guide-piece F and $c^2$ springs out through the outer hole in the shuttle-eye. In practice the operation thus minutely described takes place very rapidly. This use of the recoil of the yarn when broken to throw the free end through the outer eye of the shuttle, is, so far as I am aware, wholly new.

Ballooning of the yarn is troublesome when shuttles are run at high speed. It is caused, in part at least, by the rotary movement and centrifugal force of the yarn as it leaves the bobbin. In my improved shuttle-eye, ballooning is checked by the location and arrangement of the top of the bed-piece, A. The top of the rear portion of the bed-piece is slightly below the point of the shuttle spindle, and is concaved toward the rear edge, $a^2$. The yarn from the bobbin passes over this concave portion as shown by the dotted line in Fig. 1. When the yarn tends to fly away from the bobbin in large circles, it strikes against this concave top of the bed-piece, $a^2$ and is prevented from making large enough circles to cause trouble.

Having thus described my said invention, I claim:—

A thread guide consisting of a bed piece, a conical guide-piece, a longitudinal thread-guide, a transverse thread-guide leading to an opening in the wall of the shuttle, and a threading piece so arranged that when the yarn is pulled taut and broken over it the recoil of the yarn throws the loose end through the outer end of the transverse thread guide.

JOSEPH FALTUS.

Witnesses:
JOSEPH T. CLOUTIER,
CARL C. FORSTER.